April 5, 1932.  C. S. BRAGG ET AL  1,852,287
BRAKE MECHANISM
Filed June 28, 1929
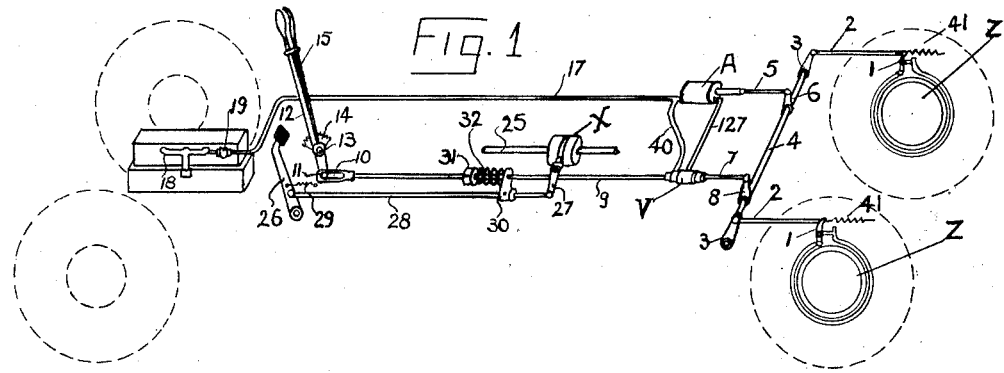
INVENTORS
CALEB S. BRAGG
VICTOR W. KLIESRATH
BY John F. Ryan
ATTORNEY Patented Apr. 5, 1932

1,852,287

UNITED STATES PATENT OFFICE

CALEB S. BRAGG, OF PALM BEACH, FLORIDA, AND VICTOR W. KLIESRATH, OF PORT WASHINGTON, NEW YORK, ASSIGNORS TO BRAGG-KLIESRATH CORPORATION, OF LONG ISLAND CITY, NEW YORK

BRAKE MECHANISM

Application filed June 28, 1929. Serial No. 374,502.

This invention relates to brakes and is illustrated as embodied in a brake system for an automotive vehicle.

Automotive vehicles of the heavier type such as trucks and busses are usually equipped with two separately operable sets of brake mechanisms, one of larger areas, which is usually applied by a long hand lever, and the other of smaller areas, capable of lesser sustained braking effort and usually applied by a foot pedal or foot lever. The power which an operator of a vehicle is capable of exerting on the brake mechanism is limited by his physical strength and by the leverages through which the force he is capable of exerting may act. The "throw" of the foot pedal is limited by the distance the operator may conveniently lift his leg, and this in turn is governed by the position of the steering wheel, which must be located where it can be most effectively manipulated. As a result of these limitations, the foot pedal is usually connected to the brake mechanism of smaller areas which can be effectively applied by the physical power of the operator, but is of insufficient area to meet the maximum braking demands. For severe or continued braking effort such as is necessary when the vehicle is travelling at high speed or descending steep grades, larger and more rugged brake mechanism must be used and is usually connected to the hand lever which provides greater leverage than the foot pedal so that an operator may effectively apply the larger brake mechanism by his physical power.

With extreme weights and speeds it is desirable and almost necessary to use the brake mechanism having the larger braking areas or to use both brake mechanisms simultaneously to obtain the desired deceleration without burning out the friction elements of the brakes, but it is often inconvenient and perhaps even dangerous or impossible for an operator to remove his hand from the steering wheel and to operate the hand lever while pressing on the foot pedal, whereas he can always operate the foot pedal alone, so it is an object of this invention to produce a combination of elements which will enable the operator to apply both brake mechanisms simultaneously upon actuation of one of the operator operated parts, in this case the foot pedal.

It is also an object of this invention to utilize simultaneously all the brake areas available on an automotive vehicle with practically no more physical effort than is required to actuate only part of the brake equipment and to accomplish this by the movement of only one operator operated part and at the same time to make each brake system with its separate operator operated part independently operable by physical power, and to do all these with a minimum of parts.

It is still a further object to connect the various elements making up two brake mechanisms so that in case of failure of the power actuator for any reason whatsoever, either brake mechanism may be operated independently of the other by physical force applied to the operator operated part connected thereto.

We accomplish these objects by using a servo motor or power actuator to operate one brake mechanism, usually the larger brake mechanism, and furnish a control mechanism for said power actuator, capable of being actuated by either the hand operated brake lever or the foot pedal.

Both brake mechanisms may operate on the wheels of the vehicle or one may operate on the wheels and the other, usually the foot operated brake, on the propeller shaft (on a shaft driven vehicle) as disclosed. As the design of the complementary friction elements of the brake mechanisms form no part of this invention, they may be of any of the types known to the art, such as external contracting brakes as disclosed.

The invention described in this application does not lie in the particular power actuator or control mechanism therefor, but rather in the combination of elements described herein which go to make up the brake system as a whole. Therefore, it is contemplated to include within the scope of this invention any of the servo motors or power actuators now known to the art such as vacuum servo motors which use a source of low pressure such as the intake manifold as indicated in the embodiment disclosed.

The above and other objects and features of the invention, including various novel combinations of parts and desirable particular constructions, will be apparent from the following description of one illustrative embodiment shown in the accompanying drawings in which, Fig. 1 is a diagrammatic perspective view of an automotive vehicle showing the arrangement of the various parts of the brake combination.

Fig. 2 is a sectional view of a power actuator shown in Fig. 1.

Fig. 3 is a sectional view of the control valve for the power actuator.

In the embodiment of our invention shown in Fig. 1, Z—Z represents brake mechanism for an automotive vehicle which may be of any type known to the art but which is shown as an external contracting type of brake adapted to be actuated by brake band lever, 1—1 attached to rod, 2—2, connected to brake arm, 3—3, carried by cross shaft, 4, to which is attached power actuator, A, (shown in detail in Fig. 2) by means of rod, 5, connected to the piston rod thereof and arm, 6, which is keyed to shaft, 4. The retracting springs are shown at 41 for releasing the brakes.

The control valve for actuator, A, is shown at V, and in detail in Fig. 3. It comprises relatively movable parts which are described in detail hereafter. One of said parts, including the valves, is connected to and movable with the brake mechanism by means of rod, 7, and an arm, 8, which is keyed to cross shaft, 4, as is arm, 6. The casing of valve, V, and the other parts connected to and movable with the casing as distinguished from the parts connected to the brake mechanism, are connected to an operator operated part shown as a hand lever, by means of rod, 9. Rod, 9, has a slotted yoke, 10, on the forward end thereof which co-operates with a pin, 11, on the end of the hand lever to form a lost motion connection of that conventional type well-known as a slot and pin connection. This lost motion connection allows forward movement of rod, 9, to apply the brake mechanism, Z, under the power of the actuator, A, without movement of the hand lever, 12, which is of the usual emergency brake type pivoted at 13, and having a locking ratchet and pawl, 14, operated by the auxiliary hand lever, 15.

We have seen fit to describe our invention as embodying that type of power actuator known as a vacuum actuator which operates on atmospheric pressure as the higher pressure and a sub-atmospheric pressure as the lower pressure. The lower pressure may be conveniently obtained by connecting the actuator to the intake manifold of the internal combustion engine between the throttle valve and the engine cylinders, pipe, 17, leads from the forward end of the actuator, A, to the intake manifold, 18, and pipe, 127, from the rear thereof through control valve mechanism to pipe, 17. A check valve, 19, is placed in the line to insure the flow of fluid in one direction only so that if the pressure in the intake manifold should increase over that maintained in the actuator cylinder, the check valve, 19, will close and maintain the lower pressure in the actuator cylinder.

A separately operable brake mechanism is shown at X, mounted on the propeller shaft, 25, of the vehicle in a manner well-known to the art. Brake mechanism, X, is connected to and adapted to be operated by foot pedal, 26, by means of brake arm, 27, and connecting rod, 28. At 29 we have shown a retracting spring attached to pedal, 26, and to a stationary part of the vehicle for returning the brake mechanism, X, to its retracted or "off" position.

An intersecting arm, 30, is rigidly secured to rod, 28, and projects in the direction of rod, 9, and has an aperture near one end thereof through which rod, 9, may freely move. A collar, 31, is secured to rod, 9, and is spaced from arm, 30, by a coil spring, 32, which is interposed on the rod, 9, between arm, 30, and collar, 31, and is so sized and calibrated that when both brake mechanisms are in retracted position, it will not exert any pressure therebetween.

The actuator and control valve mechanism are fully described and claimed in other applications filed by us so that we shall only briefly describe them here. The actuator, A, as shown in this instance (see Fig. 2), comprises a cylinder, 101, closed at both ends by heads, 102, provided with a piston, 103, having a hollow piston rod, 105, provided with a cap, 108, carrying attaching lug, 109, connected in this instance by a link, 5, to cross shaft, 4, and thus to brake mechanism, Z—Z. The cylinder, 101, is shown provided with a guiding sleeve, 105ª, secured to one of the heads, 102, and having a guiding engagement with the interior of the hollow piston rod, but this is not essential. The forward end of the cylinder, 101, is connected by a pipe, 17, with the intake manifold, as shown in Fig. 1.

The valve mechanism, V, shown in Fig. 1 and illustrated in detail in Fig. 3, comprises a valve casing, 110, provided with a valve chamber, 111, in which are located a suction valve, 140, and an air inlet valve, 141, slidingly mounted on a rod, 120, between collars, 140ª and 141ª, and provided with an intermediate spring, or springs, 150. The valve casing is provided with a suction chamber, 107, adjacent to the suction valve, having a communicating aperture, 112, and the valve casing is further provided with an air inlet chamber, 113, having an air inlet aperture, 114, which may communicate with an air strainer as shown. Means are provided for limiting the lost motion between the valve casing, 110, and the valve actuating rod, 7, comprising in this instance a collar, 128, on the rod, 7, which is adapted to engage one end of an adjustable sleeve, 129, with which the valve casing is provided. This lost motion is sufficient to permit of the operation of the valve mechanism, and when taken up will transmit the physical force of the operator directly through the valve mechanism to the brake mechanism connected therewith, as herein described. The valve chamber, 111, of the casing is provided with an aperture, 115, which is connected by a pipe, 127, with the cylinder, 101, of the actuator, A, in rear of the piston thereof. Suction chamber, 107, of the valve casing is connected by a pipe, 40, with the pipe, 17, and thus to the intake manifold. A spring, 130, between collar, 128, and sleeve, 129, serves to close valve, 141, and open valve, 140, (Fig. 3) whenever the operator operated parts are released or in the released position. This spring is so calibrated that it exerts sufficient force to overcome the friction of the various parts of the brake linkage and the action of spring, 150. Spring, 32, is stronger than spring, 130, and when movement of arm, 30, is communicated therethrough to brake rod, 9, spring, 32, overcomes spring, 130, without any appreciable compression of the former.

Valve mechanism, V, maintains the rear end of cylinder, 101, connected to the source of vacuum when the actuator is in its released or retracted position (Fig. 2) because when in this position, valve, 140, is unseated, allowing communication between pipes, 40 and 127. The front end of cylinder, 101, is always in communication with the source of suction through pipe, 17. So, we have what is known as a submerged in vacuum type of actuator and it is so called because both sides of the piston are connected to the source of low pressure when the actuator is in released or retracted position. Upon movement of rod, 9, and valve casing, 111, to the left (Fig. 3), low pressure valve, 140, is closed and thereafter high pressure valve, 141, is opened, allowing atmospheric pressure to pass through pipe, 127, to the rear end of cylinder, 101, creating a difference of pressure on both sides of piston, 103, which will cause it to move to the left (Fig. 2) with resultant application of the brake mechanism. When the operator ceases to move rod, 9, forwardly or to the left (Fig. 1), and holds it stationary, the power actuator will continue to move rod, 7, to the left until the high pressure inlet valve, 141, closes and the brake system comes to a state of equilibrium with the forces acting to apply the brakes just equal and opposite to the resistance of the brake mechanism. Further movement of the rod, 9, to the left by the operator will again reopen high pressure valve, 141, and re-connect the rear end of the cylinder of the actuator to the source of high pressure (in this case the atmosphere), and cause the piston thereof to move still further to the left and thus increase the application of the brake mechanism. This action may be continued by the operator until the full force that the actuator is capable of exerting is applied to the brake mechanism. When the operator wishes to release the brake mechanism, he allows rod, 9, to move to the right by releasing the pressure on the operator operated part which is serving to actuate rod, 9, and the result is that spring, 130, closes the high pressure valve, 141, and upon further movement opens low pressure valve, 140, so that the rear end of the cylinder is reconnected to the source of low pressure and the differential of pressure acting upon piston, 103, is decreased with a resultant decrease of braking effort, and when the pressure is equalized on both sides of the piston, the retracting springs, 41—41, will return the brake mechanism to its off position. Whether rod, 9, is moved by hand lever, 12, or by the foot pedal, the mode of operation described above is obtained.

When the operator presses foot pedal, 26, and actuates brake mechanism, X, arm, 30, will engage spring, 32, which is so calibrated that it will transmit enough force to collar, 31, and rod, 9, to operate valve, V, before being compressed, so that actuator, A, will apply brake mechanism, Z—Z. The brakes will be applied, held as applied or released at the will of the operator as described in the last paragraph and their application or release will be proportional to the movement of the foot pedal, 26.

After the power actuator, A, has exerted its maximum force in applying the brake mechanism, Z—Z, the physical power of the operator may be added thereto by applying further pressure to the brake lever, 12, which will cause the lost motion in valve, V, to be taken up and collar, 120, to contact with adjustable sleeve, 129, so that the physical force of the operator is added and directly communicated to the brake mechanism, Z—Z.

It may be seen from the above description and explanation of the mode of operation of our device that no more effort is required of the operator to apply both sets of brake mechanisms than is required to operate brake mechanism, X, alone, except for the force required to overcome the spring, 130, in valve mechanism, V. This is very small and may be considered as negligible.

Should the power fail, the operator can apply the brake mechanism, Z, by pushing on the foot pedal and compressing spring, 32, which is not sufficiently strong to detract materially from his physical strength, and he may also apply brake mechanism, Z—Z, by physical force through hand lever, 12, and thus operate either or both brake mechanisms just as if no power actuator were on the vehicle.

We claim:—

1. In combination, a brake mechanism, a power actuator connected to and adapted to apply the said brake mechanism, a control valve for said power actuator, an operator operated part connected to said control valve, a separate manually operable brake mechanism, an operator operated part connected to and adapted to actuate said latter brake mechanism, and means for connecting said latter operator operated part to said control valve so that movement of said latter operator operated part to apply said latter brake mechanism is communicated to said control valve to actuate it and cause said power actuator to apply the brake mechanism connected thereto.

2. In combination, a brake mechanism, a power actuator connected to and adapted to apply the said brake mechanism, a control valve for said power actuator, an operator operated part connected to said control valve, a separate manually operable brake mechanism, an operator operated part connected to and adapted to actuate said latter brake mechanism, and yielding means for connecting said latter operator operated part to said control valve so that movement of said latter operator operated part to apply said latter brake mechanism is communicated to said control valve to actuate it and cause said power actuator to apply the brake mechanism connected thereto.

3. In an automotive vehicle, a brake mechanism adapted to be operated by a power actuator under the control of an operator operated control valve connected thereto, a second brake mechanism, a second operator operated part connected to said second brake mechanism to operate the same, and means for connecting said second operator operated part to said control valve so that movement of the second operator operated part to apply the brake mechanism connected thereto will actuate said control valve and cause said power actuator to apply the first mentioned brake mechanism.

4. In an automotive vehicle, a plurality of brake mechanisms, some of said brake mechanisms adapted to be actuated by a power actuator under the control of an operator operated control valve connected thereto, a second operator operated part connected to other of said brake mechanisms to operate the latter by physical power applied to said second operated part and means for communicating movement of the latter operator operated part to the control valve to cause relative movement of the parts thereof and resultant actuation of the power actuator to apply the first mentioned brake mechanism.

5. In an automotive vehicle, a brake system comprising a brake mechanism, a power actuator connected to and adapted to actuate said brake mechanism, and a control valve for said power actuator and a separately operable brake system comprising brake mechanism, an operator operated part, linkage connecting said operator operated part and said latter brake mechanism to enable the operator to apply said latter brake mechanism by physical power, and yielding means connecting said brake systems and capable of transmitting only enough force to actuate said control valve but not enough to apply said first mentioned brake mechanism without the aid of said power actuator when the operator applies his physical force to said latter operator operated part.

6. In a brake system for an automotive vehicle, brake mechanism adapted to be operated by power, a power actuator operably connected thereto, an operator operated part for said brake mechanism adapted to control said brake mechanism when operated by power, and to enable the operator to actuate said brake mechanism by physical force in case of failure of power, a control valve for said power actuator connected to said operator operated part and to said brake mechanism and adapted to be actuated by said operator operated part and said brake mechanism, a separate brake mechanism, a second operator operated part connected to said separate brake mechanism to operate the same and means for connecting said latter operator operated part to said control valve so that movement of said latter operator operated part will cause the actuation of said control valve to operate said power actuator but will not produce an application of the first mentioned brake mechanism by physical force exerted on the last mentioned operator operated part.

7. In an automotive brake system, a power brake mechanism comprising complemental friction elements, a power actuator operably connected thereto, a control valve for said power actuator, an operator operated part, and brake linkage connecting said operator operated part, said control valve and the movable element of said power actuator, physically operable brake mechanism, a second operator operated part, and brake linkage operably connecting said brake mechanism and said second mentioned operator operated part, and means for yieldably connecting the respective brake linkages so that movement of the latter will produce actuation of said control valve with resultant application of the first mentioned brake mechanism by said power actuator.

8. In an automotive vehicle, a power operated brake system comprising, brake mechanism, a power actuator comprising stationary and movable parts, said actuator adapted to actuate said brake mechanism, a control valve for said power actuator having relatively movable parts operated by a lost motion connection, an operator operated part for said power operated brake system, brake linkage connecting said operator operated part to one part of said valve mechanism and the other part of said valve mechanism to said brake mechanism and to the movable element of said power actuator, a manually operable brake system comprising brake mechanism, an operator operated part for said manually operable brake system, brake linkage connecting said second operator operated part to said second mentioned brake mechanism, an arm rigidly attached to the manually operable brake linkage with means for slidably receiving said power operated brake linkage, and a spring interposed between said arm and a collar attached to said last mentioned brake linkage so that movement of said physically operable brake linkage to apply the brake mechanism connected thereto will cause sufficient motion of said first mentioned linkage to actuate said control valve with resultant movement of said power actuator to apply said first mentioned brake mechanism but will not cause sufficient motion to apply said power brake mechanism by the physical force applied to the last mentioned operator operated part.

9. In an automotive vehicle, a power operated brake system comprising an operator operated part, brake mechanism, a power actuator adapted to actuate said mechanism, a control valve for said power actuator, linkage connecting the relatively movable parts of said control valve with said brake mechanism and said operator operated part respectively, a manually operable brake mechanism, an operator operated part therefor, linkage connecting this latter operator operated part with said manually operable brake mechanism, and means for connecting the respective brake linkages together through a yielding connection in order that movement of the manually operable brake linkage is communicated to the power operated brake linkage with sufficient force to cause relative movement between the parts of the control valve but not to cause physical operation of the power operated brake system by force applied to the operator operated part of the manually operable brake system in case of failure of the power actuator to respond to the actuation of the control valve.

10. In a brake system for an automotive vehicle, a brake mechanism adapted to be applied by power, a power actuator connected thereto, a control valve for said power actuator, an operator operated part for said brake mechanism, linkage connecting said operator operated part to said control valve and to said brake mechanism, a brake mechanism adapted to be operated by the physical power of the operator, an operator operated part for said latter brake mechanism, linkage connecting said latter operator operated part to said latter brake mechanism, and means for yieldably connecting said latter linkage to said former linkage between the operator operated part therefor and the control valve so that movement of the latter linkage may be communicated to said control valve to cause actuation of said servo motor.

11. In an automotive vehicle, a power operated brake system comprising brake mechanism, a power actuator operably connected thereto, a control valve for said power actuator, an operator operated part for said brake mechanism, linkage connecting said operator operated part, said control valve and said brake mechanism, a lost motion connection between said linkage and said operator operated part so that said linkage may be moved to apply the brake mechanism without moving said operator operated part, a separate physically operable brake system comprising brake mechanism, a separate operator operated part therefor, linkage connecting said latter operator operated part to said latter brake mechanism, and means for connecting said brake systems so that operation of the latter by physical force will cause operation of the former by the power actuator.

12. In an automotive vehicle, a power operated brake system comprising brake mechanism, a power actuator operably connected thereto, a control valve for said power actuator, an operator operated part for said brake mechanism, linkage connecting said operator operated part, said control valve and said brake mechanism, a lost motion connection between said linkage and said operator operated part so that said linkage may be moved to apply the brake mechanism without moving said operator operated part, a separate physically operable brake system comprising brake mechanism, a separate operator operated part therefor, linkage connecting said latter operator operated part to said latter brake mechanism, and yielding means connecting said brake systems so that operation of the latter by physical force will cause operation of the former by power supplied by the power actuator but will not cause operation thereof by physical force applied to said latter operator operated part in case of failure of said power actuator.

In testimony whereof we have hereunto set our hands.

CALEB S. BRAGG.
VICTOR W. KLIESRATH.